United States Patent [19]

Callsen et al.

[11] Patent Number: 4,920,610
[45] Date of Patent: May 1, 1990

[54] METHOD FOR MECHANICALLY REMOVING THE WINGS FROM POULTRY BODIES AND APPARATUS THEREFOR

[76] Inventors: Hans Callsen, Am Bormbrook 2, 2407 Bad Schwartau, Fed. Rep. of Germany; Wilhelm Richert, 1412 Kelly Bridge Rd., Dawsonvill, Ga. 30534; Horst Braeger, Auf dem Ruhm 14, 2400 Lübeck, Fed. Rep. of Germany

[21] Appl. No.: 260,786

[22] Filed: Oct. 21, 1988

[30] Foreign Application Priority Data

Oct. 23, 1987 [DE] Fed. Rep. of Germany ....... 3735849

[51] Int. Cl.$^5$ .............................................. A22C 21/00
[52] U.S. Cl. ............................................ 17/11; 17/46; 17/52
[58] Field of Search .......................... 17/11, 52, 45, 46

[56] References Cited

U.S. PATENT DOCUMENTS

| | | | |
|---|---|---|---|
| 4,306,335 | 12/1981 | Hawk et al. | 17/52 |
| 4,503,587 | 3/1985 | Martin | 17/52 |
| 4,536,919 | 8/1985 | Cashwell et al. | 17/52 |
| 4,563,791 | 1/1986 | Martin et al. | 17/11 |
| 4,597,136 | 7/1986 | Hazenbroek | 17/52 |
| 4,648,155 | 3/1987 | Burnett | 17/46 |

*Primary Examiner*—Willis Little
*Attorney, Agent, or Firm*—Thomas R. Morrison

[57] ABSTRACT

A method for removing wings from poultry bodies and an apparatus for performing the method are described, in which a poultry body held on a conveyor is supplied to a separating mechanism. The latter comprises either two successive separating tools or only a single one. In the first case, the first tool of the two comprises a pair of circular knives arranged symmetrically to the path of the conveyor and which can be moved from the back of the poultry body into the bend between the latter and the humerus of the wing and cuts through the skin and ligaments, as well as the large wing tendons in the region of the body joint. The second separating tool, which, in the second case forms the single tool, comprises a pair of triangular knife blades with rising cutting edges, which continue the previously described cuts, and, if necessary, take over the function of the first tool, said separating process taking place in the joint gap, because, during this action, the wing is held by guide means in the form of a conveyor equipped with clamping entrainers and is drawn away from the poultry body.

17 Claims, 2 Drawing Sheets

METHOD FOR MECHANICALLY REMOVING THE WINGS FROM POULTRY BODIES AND APPARATUS THEREFOR

BACKGROUND OF THE INVENTION

1. Field of the Invention

The invention relates to a method for mechanically removing the wings from poultry bodies and to an apparatus for performing the method, comprising a conveying means positively securing the poultry body to be processed and advancing the same in its plane of symmetry, as well as a severing mechanism comprising separating tools for the wings arranged on either side of the plane of revolution of the conveying means.

It is important in the case of such processing of poultry bodies, particularly with a view to further mechanical handling, e.g. for obtaining breast meat in the form of fillets, that the wings be severed with the minimum possible loss in consumable meat and, in particular, in such a way that no disturbing bone residues are left behind in the region of the severing position.

2. Prior Art

NL No. 73 16 326 discloses an apparatus for cutting off the extremities from poultry bodies by driven circular shearing knives, which are moved in from the belly side between the extremities and the rump when the latter passes the tools while being conveyed by means of a conveyor system comprising an upper and a lower conveyor belt. With the shearing knives are associated guide rolls of small diameter which, in conjunction with an elastic mounting of the shearing knife unit, permit a guidance thereof through the body contour and the setting of the cutting plane in accordance with the particular circumstances.

Further apparatus of this type is disclosed by U.S. Pat. No. 4,646,155, in which apparatus the poultry bodies to which the wings are still attached, are guided in a saddled manner with the breast side upwards to a pair of circular saws with the neck opening leading, the wings being supported by guide rails engaging from the back in the joint bend. The separation of the wings from the poultry body takes place by a frontal incision, complete separation not being performed. The remaining connection between the wings and the breast meat is subsequently used in order to draw the latter from the carcass by raising the wings.

In the case of both these apparatuses the separation of the wings takes place through a severing of the upper arm bone (humerus) and it is unavoidable therein that residues of at least the joint menisci thereof remain on the poultry body. This leads to difficulties in the further processing operation for obtaining the breast meat in the form of fillets, both with regard to the freedom from bones and the meat yield.

3. Object of the invention

It is the main object of the invention to overcome such shortcomings and to achieve a separation of the wings in the joint gap of the body joint.

SUMMARY OF THE INVENTION

According to the invention this object is achieved by a method, which is characterized by the steps of cutting through of the tendons holding the humerus in the body joint by an incision from the back and up to said humerus; lifting out the body joint by relative drawing apart of the poultry body and wing; and cutting through the remaining and still connecting skin portions and muscular fibres in the drawn apart position.

In an apparatus for performing said method and comprising a conveying means positively securing the poultry body to be processed and advancing the same in its plane of symmetry, as well as a severing mechanism comprising separating tools for the wings arranged on either side of the plane of revolution of the conveying means, the object is achieved in that the severing mechanism comprises a first separating tool for cutting through the wing tendons and a second separating tool, following the first tool, for cutting off the wings and that in the region of the severing mechanism guide means are provided which seize the wings and move them away from the poultry body.

The resulting advantages are in particular that the wings are separated from the poultry body in such a way that it is readily possible to obtain boneless breast fillets at a high meat yield.

The first separating tool for cutting through the tendons holding the wings in the body joint can, according to a preferred embodiment of the invention, comprise a pair of driven circular knives, which are arranged in roof-like manner and symmetrically on either side of the plane of revolution of the conveying means and can be moved into the region of the body joints of the wings in a controlled manner.

The second separating tool following the first separating tool may comprise a pair of knife blades arranged symmetrically to the plane of revolution of the conveying means and whose flanks in the basic position of the blades are substantially parallel to one another, whereas the cutting edges of said blades are oriented so as to rise in the conveying direction, said knife blades being constructed in a displaceable or controllable manner with respect to the spacing between them and to the mutual angular position of their flanks.

According to another embodiment of the invention, it is, however, also possible for the separating mechanism to solely comprise the aforementioned pair of knife blades arranged symmetrically to the plane of revolution of the conveying means. Thus, the functions of the first and second separating tools are combined. In any case, it can be advantageous for a reliable performance of said functions for the knife blades to be subject to an oscillatory movement. However, depending on the particular requirements, it may also be appropriate to use as the second separating tool a pair of driven circular knives, which are arranged in a V-shaped manner symmetrically to the plane of revolution of the conveying means and can be moved in a controlled manner into the region of the body joints of the wings from the breast side of the poultry body until connecting with the cutting plane of the circular knives. According to another preferred construction the guide means may be constituted by a pair of holding means for the wings, which means are arranged on either side of the plane of revolution of the conveying means and which are driven so as to accompany the conveying means. The function of the holding means can also be taken over by a pair of endless conveyors equipped with entraining elements and whose speed of advance corresponds to that of the conveying means. In order to favour the engaging behind the wings by the entrainers, the speed of advance of the conveyor can be increased and in this way it is possible that the entrainers only engage or come to rest on the wings when they have entered the working area of the separating mechanism.

In order to permit a positive engagement of the humerus of the wing, each entraining element can be constructed as a controlled clamp, which is closed just prior to reaching the working area of the separating mechanism.

BRIEF DESCRIPTION OF THE DRAWINGS

Other and further objects of the present invention will be apparent form the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
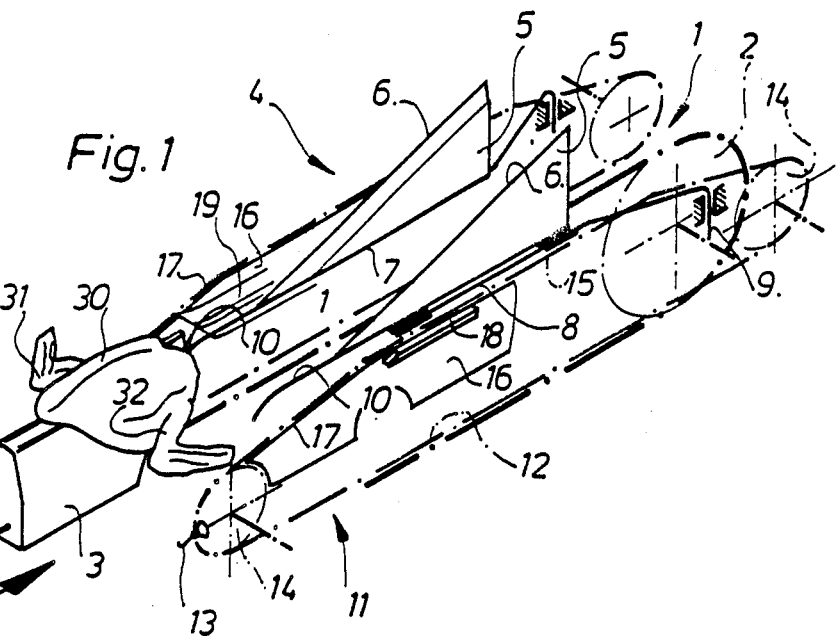
FIG. 1 shows an axonometric overall view of a separating mechanism.
Figure 2:
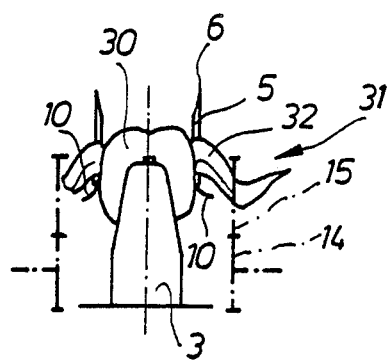
FIG. 2 shows a front view of the apparatus according to FIG. 1, viewed from the feeding end.
Figure 3:
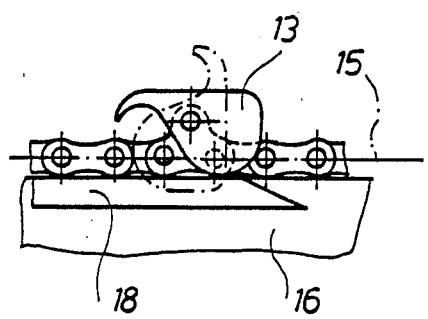
FIG. 3 shows a detailed sectional view of the upper run of the conveyor for the wings with an entraining element.

The apparatus according to FIG. 1 is mounted on a not shown frame, in which is driven in an appropriate rotary manner a conveying means 1 guided by two guide or deflection wheels 2 and e.g. in the form of an endless chain. The conveying means 1 is provided with support means e.g. in the form of support saddles 3, which receive poultry bodies 30 to be processed with the breast bone upwards and the ridge of the latter in the conveying direction and whilst supported on the inside thereof. The path of the support means 3 also leads through the region of a severing mechanism 4, which comprises a pair of knife blades 5 arranged in the plane of revolution of the conveying means 1. Each of the knife blades 5 has the configuration of a triangular surface, whereof one side is constructed as a cutting edge 6. The arrangement of the knife blades 5 is such that their triangular surfaces are substantially parallel to one another, their base edges 7 being substantially horizontal and the cutting edges 6 being oriented so as to rise at an acute angle thereto. Each knife blade 5 is fixed to a supporting arm 8, which simultaneously forms a swivel axis for the associated knife blade 5 and which runs substantially parallel to the path of the support means 3. Each supporting arm 8 is in turn pivotable about an axis 9 arranged perpendicular thereto. The knife blades 5 are held in the indicated basic position by not shown springs against which they can be moved away from one another. In the extension of the base edge 7, each knife blade 5 has a guide 10 curved in skid-shape manner, which extends counter to the conveying direction of conveying means 1.

Guide means 11 coming into operative engagement with the wings 31 are arranged in the region of severing mechanism 4. They comprise a pair of holding means constituted by a pair of endless conveyors 12 equipped with controllable, preferably clamp-shaped entraining elements 13, each of which conveyors 12 can comprise a link chain carrying said entrainers. The conveyors 12 are guided by guide or deflection wheels 14 in planes parallel to the plane of revolution of the conveying means 1, each conveyor 12 with its upper run 15 passing at a certain distance along side the outer flank of the respectively associated knife blade 5 and substantially parallel to its base edge 7 and being driven together with the conveying means 1. In a central portion of it, the upper run 15 is raised by means of a support rail 16 beyond the tangent to the guide wheels 14, whilst forming approach ramps 17, and is consequently guided roughly level with the wings 31. In the region of the raised upper run 15 there is located a cam rail 18 for controlling the entraining elements 13 from an erect position brought about by a not shown spring into a closed position. Finally, above the path of the support means 3, there is provided a holding-down device 19, which is vertically displaceable against spring tension, for holding down the poultry body to be processed onto the support means 3.

The apparatus according to FIG. 1 functions as follows:

A breast portion of a poultry body with wings prepared by an oblique cut made between the upper and lower extremities and extending transversally through the backbone or rachis is inverted onto the support means 3 with the breastbone or sternum upwards and the neck part leading and accompanied by a holding down by means of the holding down device 19 is supplied to the severing mechanism 4. The wings with their upper armbones or humerus initially pass onto the guides 10 arranged in the extension of the knife blades 5, which are displaced to a mutual spacing which corresponds to the width of the poultry body to be processed, so that the guides 10 penetrate from the back of the poultry body 30 into the bend between the humerus 32 and the poultry body 30. As the advancing carries on, the wings 31, with their humerus 32, come to rest on the approach ramps 17 of the conveyors 12 and are increasingly displaced upwardly, the entrainers 13 supporting the wings from the rear in the region of the humerus 32. The latter process can be optimized by a slightly higher speed of the conveyor 12 compared with the speed of the support means or saddles, which makes it possible for the entrainer element 13 to approach the wing. Matching takes place in such a way that engagement takes place roughly on reaching the knife blades 5, and simultaneously the entrainer element 13 is controlled by means of the cam rail 18 to reach the closed position positively engaging round the humerus. From the said bend, the cutting edges 6 of knife blades 5 now start to separate the skin and ligaments in the region of the wing joint and finally to cut through the wing tendons controlling the upward movement of the wings 31. As a result of the biaxial displaceability* of the knife blades 5 this process takes place in the region of the joint gap, which is now enlarged without any significant force expenditure following the cutting through of the wing tendons as a result of the bending strain produced by the conveyor 12 and acting on wings 31. The advancing cut consequently continues in said joint gap, so that finally there is a complete separation of the wing 31 without any touching or cutting of the bone.

Figure 4:
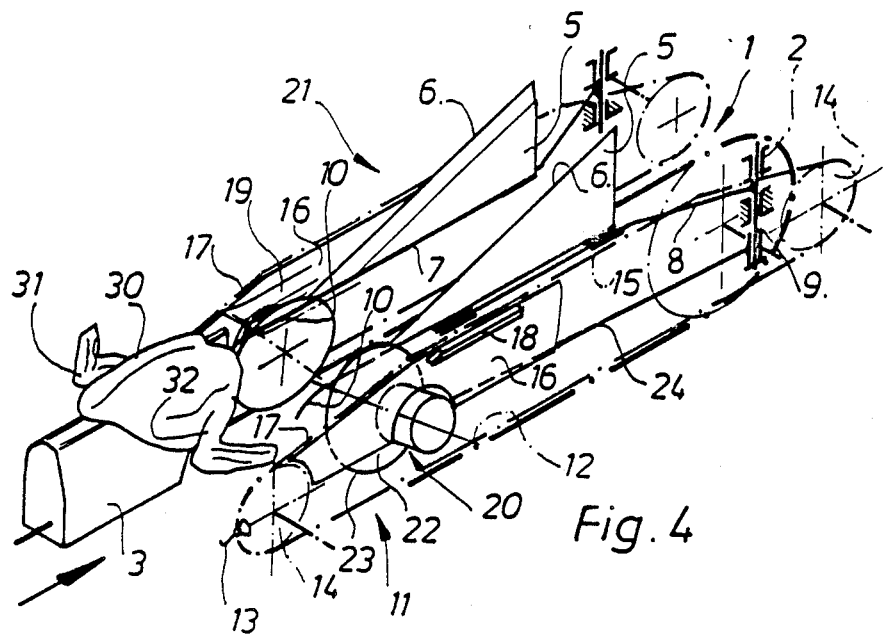
FIG. 4 shows an axonometric overall view of another embodiment of the separating mechanism.
Figure 5:
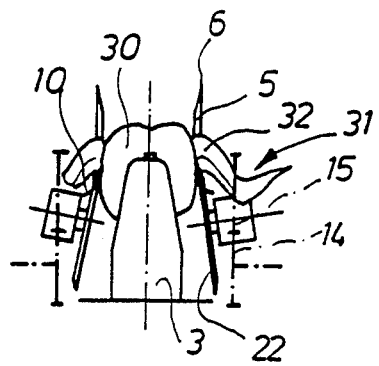
FIG. 5 shows a side view of the mechanism according to FIG. 4 viewed from the feeding end.

As shown in FIGS. 4 and 5, the severing mechanism 4 can be constructed as a second separating tool 21, upstream of which is arranged a first separating tool 20.

The latter comprises a pair of suitable driven circular knives 22, which are preferably set with respect to one another in a slightly roof-shaped manner. They are arranged in the region of guides 10 and engage on the outsides thereof, whilst possibly leaving a small gap, the circular cutting edges 32 projecting by a small amount over the guides 10. Each of the two circular knife units is mounted on a pivot arm 24, which is pivotable about the axis 9 of the associated knife blades 5. As a result of a suitable coupling with the supporting arm 8 carrying the corresponding knife blade 5, the particular circular knife unit also performs the arm's pivoting movement therewith.

The upstream arrangement of the separating tool 20 ensures that the often tough skin portions and ligaments between the wing 31 and the poultry body 30 are reliably separated, which is the prerequisite for the satisfactory performance of the method according to the invention.

The circular knives 22 of the separating tool 20, on leaving a corresponding degree of freedom, can also be controlled with respect to their vertical position as a function of the size of the particular poultry body 30 to be processed. For this purpose appropriate coupling members can be provided between the holding down device 19 and the circular knife units, which transfer the size dependent displacement movement of the holding down device 19 to the circular knife unit.

The securing of the poultry body 30 on the support means or saddles 3 can take place by a clamp seizing and securing the poultry body 30 preferably on the breast bone (sternum) part facing the neck opening.

What is claimed is:

1. An apparatus for processing poultry by mechanically removing wings from bodies of said poultry, said wings including the humerus (wing bone, upper arm bone) connected with the bodies in body joints and held by tendons, said apparatus comprising conveying means for positively securing said poultry body to be processed, said conveying means defining a plane of revolution and advancing said poultry body in its plane of symmetry in a predetermined conveying direction, as well as a severing mechanism comprising separating tools for separating said wings, which tools are arranged symmetrically on either side of said plane of revolution of said conveying means, wherein said severing mechanism comprises a first separating tool for cutting through said wing tendons and a second separating tool downstream of said first tool for cutting off said wings, and wherein in the region of said severing mechanism guide means are arranged for seizing said wings and moving them away from said poultry body.

2. An apparatus as claimed in claim 1, wherein said first separating tool comprises a pair of driven circular knives, which are arranged in roofshaped manner and symmetrically on either side of said plane of revolution and can be moved into the area of said body joints of said wings in a controlled manner.

3. An apparatus as claimed in claim 1, wherein said second separating tool comprises a pair of knife blades arranged symmetrically to said plane of revolution and whose flanks in a basic position are substantially parallel to one another and whose cutting edges are oriented so as to rise in said conveying direction, said knife blades being displaceable or controllable with respect to their mutual spacing and the mutual angular position of their flanks.

4. An apparatus as claimed in claim 2, wherein said second separating tool comprises a pair of knife blades arrange symmetrically to said plane of revolution and whose flanks in a basic position are substantially parallel to one another and whose cutting edges are oriented so as to rise in said conveying direction, said knife blades being displaceable or controllable with respect to their mutual spacing and the mutual angular position of their flanks.

5. An apparatus for processing poultry by mechanically removing wings from bodies of said poultry, said wings including the humerus (wing bone, upper arm bone) connected with the bodies in body joints and held by tendons, said apparatus comprising conveying means for positively securing said poultry body to be processed, said conveying means defining a plane of revolution and advancing said poultry body in its plane of symmetry in a predetermined conveying direction, as well as a severing mechanism comprising separating tools for separating said wings, which tools are arranged symmetrically on either side of said plane of revolution of said conveying means, wherein said severing mechanism comprises a pair of knife blades arranged symmetrically to said plane of revolution and whose flanks in a basic position are substantially parallel to one another and whose cutting edges are oriented so as to rise in the conveying direction, said knife blades being displaceable and controllable with respect to their mutual spacing and the mutual angular position of their flanks, and wherein in the region of said severing mechanism guide means are arranged for seizing said wings and moving them away from said poultry body.

6. An apparatus as claimed in claim 3, wherein said knife blades are subject to an oscillatory movement.

7. An apparatus as claimed in claim 5, wherein said knife blades are subject to an oscillatory movement.

8. An apparatus as claimed in claim 1, wherein said guide means are constituted by a pair of holding means for said wings, which holding means are arranged on either side of said plane of revolution of said conveying means and driven so as to accompany the latter.

9. An apparatus as claimed in claim 5, wherein said guide means are constituted by a pair of holding means for said wings, which holding means are arranged on either side of said plane of revolution of said conveying means and driven so as to accompany the latter.

10. An apparatus as claimed in claim 8, wherein said holding means are constituted by a pair of endless conveyors equipped with entraining elements and whose speed of advance corresponds to that of said conveying means.

11. An apparatus as claimed in claim 9, wherein said holding means are constituted by a pair of endless conveyors equipped with entraining elements and whose speed of advance corresponds to that of said conveying means.

12. An apparatus as claimed in claim 10, wherein the speed of advance of said conveyors is higher than that of said conveying means.

13. An apparatus as claimed in claim 11, wherein the speed of advance of said conveyors is higher than that of said conveying means.

14. An apparatus as claimed in claim 10, wherein each one of said entraining elements is constructed as a controlled clamp.

15. An apparatus as claimed in claim 11, wherein each one of said entraining elements is constructed as a controlled clamp.

16. An apparatus as claimed in claim 12, wherein each one of said entraining elements is constructed as a controlled clamp.

17. An apparatus as claimed in claim 13, wherein each one of said entraining elements is constructed as a controlled clamp.

* * * * *

UNITED STATES PATENT AND TRADEMARK OFFICE
CERTIFICATE OF CORRECTION

PATENT NO. : 4,920,610
DATED : 5/1/90
INVENTOR(S) : Hans Callsen, Wilhelm Richert, HORst Braeger It is certified that error appears in the above-identified patent and that said Letters Patent is hereby corrected as shown below:

On title page Assignee should read:

Nordischer Maschinenbau Rud. Baader GMBH + Co KG

Geniner Strasse 249, 2400 Lubeck,
Fed. Rep. of Germany

Signed and Sealed this

Eighth Day of December, 1992

Attest:

DOUGLAS B. COMER

Attesting Officer   Acting Commissioner of Patents and Trademarks